United States Patent
Arakawa et al.

(10) Patent No.: US 7,578,213 B2
(45) Date of Patent: *Aug. 25, 2009

(54) MOTORCYCLE ENGINE AND ASSEMBLING METHOD THEREOF

(75) Inventors: Hidetoshi Arakawa, Iwata (JP); Kohei Kato, Hamamatsu (JP); Tomoyuki Oda, Iwata (JP)

(73) Assignee: Suzuki Kabushiki Kaisha, Tokyo (JP)

( * ) Notice: Subject to any disclaimer, the term of this patent is extended or adjusted under 35 U.S.C. 154(b) by 376 days.

This patent is subject to a terminal disclaimer.

(21) Appl. No.: 11/524,185

(22) Filed: Sep. 21, 2006

(65) Prior Publication Data

US 2007/0068295 A1    Mar. 29, 2007

(30) Foreign Application Priority Data

Sep. 25, 2005    (JP)    ............... 2005-307776

(51) Int. Cl.
*F16H 3/08*    (2006.01)
(52) U.S. Cl. ............. 74/329; 74/337.5; 74/606 R; 384/255
(58) Field of Classification Search ........... 74/329, 74/331, 333, 335, 337.5, 606 R; 384/247, 384/252, 255, 447; 123/195 R, 195 C, 195 H, 123/195 AC, 197.5
See application file for complete search history.

(56) References Cited

U.S. PATENT DOCUMENTS

| | | | | | |
|---|---|---|---|---|---|
| 4,035,044 | A | * | 7/1977 | Miyazaki | ............ 384/447 |
| 5,078,105 | A | * | 1/1992 | Ito et al. | ............ 123/195 R |
| 5,165,294 | A | * | 11/1992 | Utsumi | ............ 74/606 R |
| 6,398,400 | B1 | * | 6/2002 | Nienhaus | ............ 384/255 |
| 6,941,918 | B2 | * | 9/2005 | Laimboeck | ............ 123/195 R |
| 7,275,872 | B2 | * | 10/2007 | Abrahamian | ............ 384/255 |
| 7,353,792 | B2 | * | 4/2008 | Oda et al. | ............ 123/195 R |
| 2004/0255897 | A1 | * | 12/2004 | Arakawa | ............ 123/197.5 |

* cited by examiner

*Primary Examiner*—David D. Le
(74) *Attorney, Agent, or Firm*—Oblon, Spivak, McClelland, Maier & Neustadt, P.C.

(57) ABSTRACT

An engine includes an engine case split into an upper case and a lower case. A crankshaft and a transmission input shaft are rotatably supported at a mating surface between the upper and lower cases, and a transmission output shaft rotated by the transmission input shaft is supported in the lower case. One side face of the lower case has a circular opening through which the transmission output shaft can be inserted from the outside. An eccentric bearing holder holding a bearing that rotatably supports one end of the transmission output shaft is mounted in the opening in a detachable manner from the outside. The axis of the transmission output shaft deviates from the center of the eccentric bearing holder toward the transmission input shaft. The inner diameter of the opening is larger than the outer diameter of the largest one of transmission driven gears of the transmission output shaft.

9 Claims, 9 Drawing Sheets

MOTORCYCLE ENGINE AND ASSEMBLING METHOD THEREOF

BACKGROUND OF THE INVENTION

1. Field of the Invention

The present invention relates to a motorcycle engine improving an arrangement of rotation shafts in an engine case and also relates to a method of assembling the engine case.

2. Related Art

Japanese Unexamined Patent Application Publication No. 2004-360773 discloses a motorcycle engine including an engine case split into two sections, namely, an upper case section and a lower case section. In order to reduce the size of the engine case in the front-rear direction, i.e., longitudinal direction of a motorcycle, a crankshaft and a transmission input shaft (counter shaft) extending in the width direction of the motorcycle are rotatably supported at a mating surface between the upper case section and the lower case section, and a transmission output shaft (driving shaft) rotated by the transmission input shaft is supported in the lower case section.

In this layout of the various rotation shafts, the transmission output shaft is mounted in the engine case through a transmission-output-shaft insertion opening formed in a side wall of the lower case section. The transmission-output-shaft insertion opening is closed in a fluid-tight manner by being covered with a bearing holder holding a bearing of the transmission output shaft. It is required for the transmission-output-shaft insertion opening to have a size such that a transmission driven gear having the largest outer diameter, of multiple transmission driven gears attached to the transmission output shaft, can pass therethrough.

However, when the size of the transmission-output-shaft insertion opening is set to be larger than that of the transmission driven gear having the largest outer diameter, the bearing holder closing the transmission-output-shaft insertion opening inevitably increases in size, and the bearing of the transmission output shaft fitted in the bearing holder is disposed largely apart from a rim of the transmission-output-shaft insertion opening. For this reason, the distance between the bearing of the transmission input shaft and the bearing of the transmission output shaft, that is, the center distance between the axis of the transmission input shaft and the axis of the transmission output shaft is increased. As a result, the size of the engine case is increased.

Further, since the bearing of the transmission output shaft is fixed to the lower case section with the bearing holder disposed therebetween, there is a risk that the positioning accuracy of the bearing will decrease depending on the working accuracy of the transmission-output-shaft insertion opening and the bearing holder.

In addition, after the transmission output shaft having the transmission driven gears is inserted in the engine case through the transmission-output-shaft insertion opening, the bearing holder is mounted. This procedure frequently makes the assembling working difficult.

SUMMARY OF THE INVENTION

The present invention was conceived in consideration of the circumstances mentioned above, and an object of the invention is to provide a motorcycle engine and its assembling method capable of mounting a transmission output shaft effectively along with a transmission driven gear in an engine case through a transmission-output-shaft insertion opening, making compact the engine case by reducing the center distance between the transmission output shaft and a transmission input shaft, improving the positioning accuracy and support rigidity of a bearing of the transmission output shaft, and improving the mountability of the transmission output shaft.

In order to achieve the above object, the present invention provides, in one aspect, an engine for a motorcycle, comprising:

an engine case splittable into an upper case section and a lower case section;

a crankshaft and a transmission input shaft extending in a width direction of the motorcycle and rotatably supported at a mating surface constituted by and between the upper case section and the lower case section; and a transmission output shaft rotatably supported in the lower case section to be rotatable by the transmission input shaft, wherein one side surface of the lower case section has a circular transmission-output-shaft insertion opening through which the transmission output shaft is inserted in the lower case section of the engine case from an outside, an eccentric bearing holder for holding a bearing that rotatably supports one end of the transmission output shaft is mounted in the transmission-output-shaft insertion opening in a detachable manner from the outside of the engine case, and an axis of the transmission output shaft deviates from the center of the eccentric bearing holder toward the transmission input shaft.

It is desirable in this aspect that the transmission-output-shaft insertion opening has an inner diameter set to be larger than an outer diameter of the largest one of transmission driven gears mounted on the transmission output shaft.

It is desired that the eccentric bearing holder is tightly and cylindrically fitted in the transmission-output-shaft insertion opening.

Another side wall of the lower case section may have a circular bearing opening, a bearing holder for holding a bearing that rotatably supports another end of the transmission output shaft is mounted in the bearing opening in a manner detachable from the outside of the engine case, and the center of the bearing holder coincides with the axis of the transmission output shaft. The bearing holder is cylindrically and tightly fitted in the bearing opening.

In another aspect of the present invention, there is provided a method of assembling a motorcycle engine, comprising the steps of:

inserting a transmission output shaft having a plurality of transmission driven gears into an engine case in an axial direction through a circular transmission-output-shaft insertion opening provided in one side surface of the engine case while holding the transmission output shaft in a position so as not to interfere with transmission driving gears of a transmission input shaft rotatably supported in the engine case, the transmission output shaft being inserted such that a leading end thereof is eccentrically exposed from a circular bearing opening provided in another side surface of the engine case, the circular bearing opening having a diameter smaller than that of the transmission-output-shaft insertion opening;

shifting the inserted transmission output shaft toward the transmission input shaft so as to mesh the transmission driven gears of the transmission output shaft with the transmission driving gears of the transmission input shaft;

fitting an eccentric bearing holder in the transmission-output-shaft insertion opening, the eccentric bearing holder having a bearing that is eccentrically attached thereto so as to support the transmission output shaft; and fitting a bearing holder in the circular bearing opening, the bearing holder having a bearing that is concentrically attached thereto so as to support the transmission output shaft.

The step of fitting the eccentric bearing holder in the transmission-output-shaft insertion opening and the step of fitting the bearing holder in the circular bearing opening may be reversed to each other in order.

In a further aspect, there is also provided a method of assembling a motorcycle engine, comprising the steps of:

inserting a transmission output shaft having a plurality of transmission driven gears into an engine case in an axial direction through a circular transmission-output-shaft insertion opening provided in one side surface of the engine case such that an axis of the transmission output shaft coincides with the center of the transmission-output-shaft insertion opening, the transmission output shaft being inserted so that a leading end thereof is eccentrically exposed from a circular bearing opening provided in another side surface of the engine case, the circular bearing opening having a diameter smaller than that of the transmission-output-shaft insertion opening;

shifting the inserted transmission output shaft toward a transmission input shaft rotatably supported in the engine case so as to mesh the transmission driven gears of the transmission output shaft with transmission driving gears mounted on the transmission input shaft;

fitting an eccentric bearing holder in the transmission-output-shaft insertion opening, the eccentric bearing holder having a bearing that is eccentrically attached thereto so as to support the transmission output shaft; and fitting a bearing holder in the circular bearing opening, the bearing holder having a bearing that is concentrically attached thereto so as to support the transmission output shaft.

The step of fitting the eccentric bearing holder in the transmission-output-shaft insertion opening and the step of fitting the bearing holder in the circular bearing opening may be reversed to each other in order.

According to the present invention of the aspects mentioned above, the center distance between the transmission input shaft and the transmission output shaft can be reduced, and the engine case can be made compact. Moreover, the transmission output shaft can be smoothly inserted in the engine case while preventing a transmission driven gear mounted on the transmission output shaft from interfering with a transmission driving gear mounted on the transmission input shaft. The mountability of the transmission output shaft can be enhanced. The transmission output shaft can be reliably positioned by the bearing holder. The eccentric bearing holder can also be easily mounted in the engine case.

In addition, since the eccentric bearing holder and the bearing holder are cylindrically and tightly fitted in the transmission-output-shaft insertion opening and the circular bearing opening, respectively, fitting portions can be formed by simple cylindrical cutting. This can increase the working accuracy of the fitting portions, and can dramatically increase the positioning accuracy of the bearings. In addition, since the load applied to the bearing of the transmission output shaft can be received by the cylindrical fitting surface in the radial direction of the transmission output shaft, the support rigidity of the bearing can be increased markedly.

Furthermore, according to the assembling method of the motorcycle engine mentioned above, the transmission output shaft can be easily mounted in the engine case through the transmission-output-shaft insertion opening while preventing the transmission driven gears from interfering with the transmission driving gears.

In the motorcycle engine according to the present invention, the transmission output shaft deviates from the transmission-output-shaft insertion opening and the eccentric bearing holder toward the transmission input shaft. Therefore, the center distance between the transmission input shaft and the transmission output shaft can be reduced, and the size of the engine case can be reduced thereby. Moreover, the transmission output shaft can be smoothly inserted in the engine case while preventing the transmission driven gears mounted on the transmission output shaft from interfering with the transmission driving gears mounted on the transmission input shaft. Consequently, the mountability of the transmission output shaft can be enhanced.

It is to be noted that the nature and further characteristic features of the present invention will be made clearer from the following descriptions made with reference to the accompanying drawings.

DESCRIPTION OF THE PREFERRED EMBODIMENTS

An embodiment of the present invention will be described hereunder with reference to the accompanying drawings. Further, it is to be noted that terms of "upper", "lower", "right", "left" and the like terms are used herein in the illustration of the drawings or in a general standing state of the a motorcycle.

Figure 1:
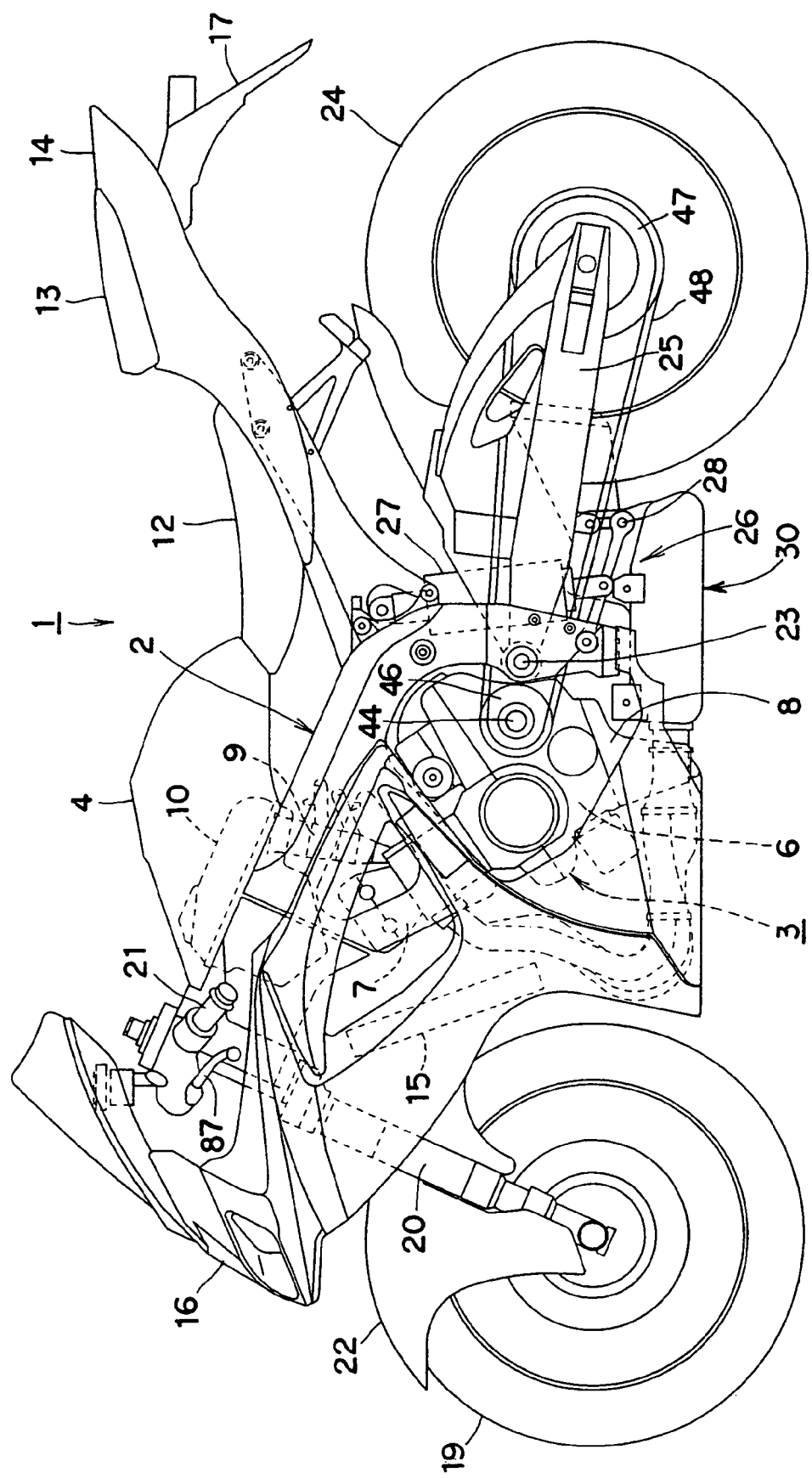
FIG. 1 is a left side view of a motorcycle in which an engine according to an embodiment of the present invention is mounted.
Figure 2:
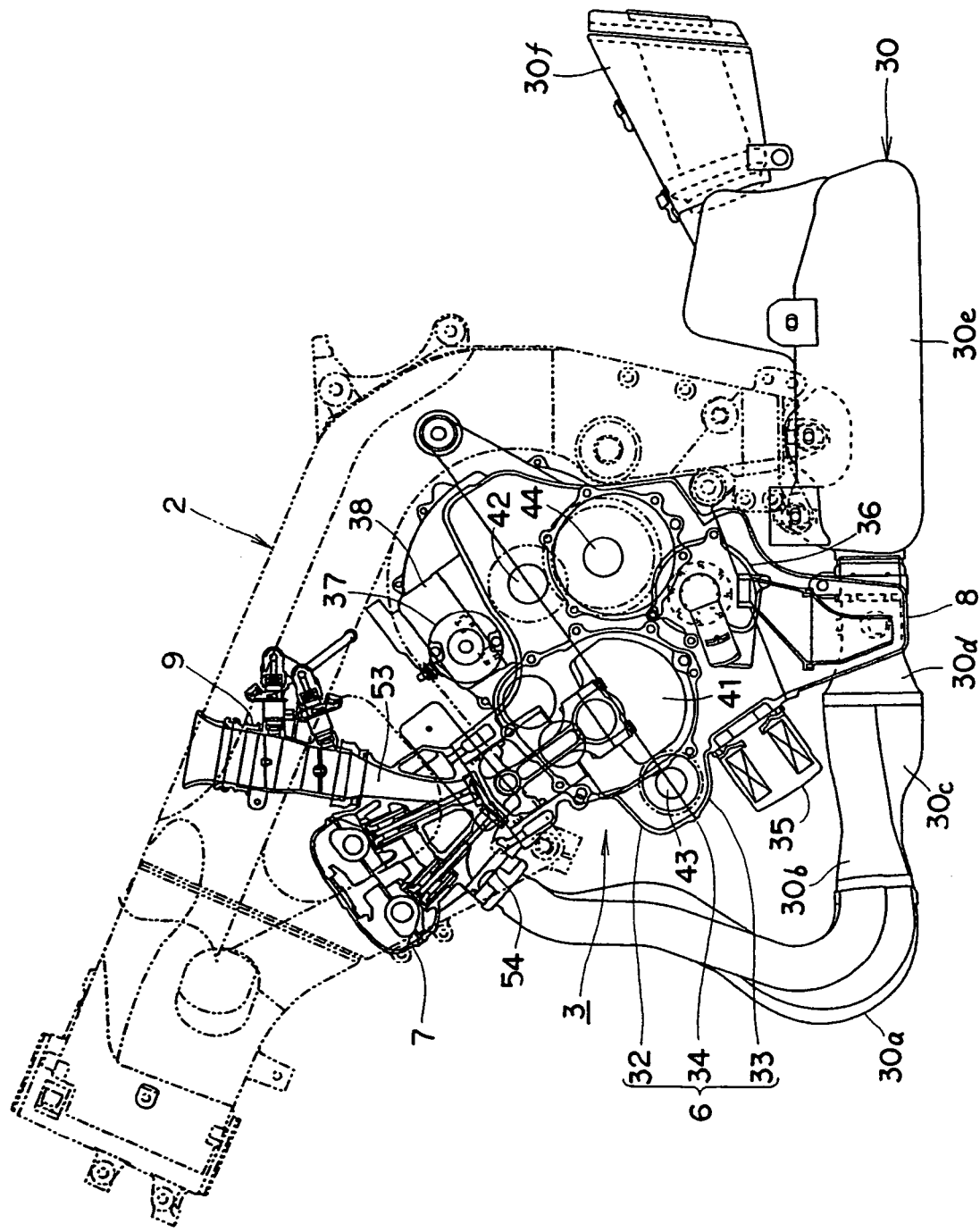
FIG. 2 is an enlarged left side view showing a front half portion of a motorcycle body frame, the engine, and an exhaust system.

With reference to FIGS. 1 and 2, a motorcycle 1 includes a body frame 2 made of, for example, aluminum. A water-cooled four-cycle engine 3 including four cylinders arranged in parallel with each other is suspended from the front half portion of the body frame 2, and a fuel tank 4 is mounted on the body frame 2 above the engine 3.

In the engine 3, a cylinder assembly 7 is disposed on an upper front side of an engine case 6, and an oil pan 8 is disposed on the lower side of the engine case 6. A fuel injector (throttle body) 9 is connected to the rear portion of the cylinder assembly 7, and an air cleaner 10 disposed in a recess formed on the lower surface of the fuel tank 4 is connected to the fuel injector 9.

A rider's seat 12 and a passenger's seat 13 are disposed along with a rear cowling 14 behind the fuel tank 4, and a radiator 15 is provided in front of the cylinder assembly 7 of the engine 3. The front half of the body of the motorcycle 1 is covered with a streamlined front cowling 16 made of resin. A rear fender 17 is attached to the rear of the rear cowling 14.

A front fork 20 for supporting a front wheel 19 is supported at the front of the body frame 2 so as to be steered in the right-left direction (width direction) along with a steering lever 21 and a front fender 22. A swing arm 25 for supporting a rear wheel 24 is supported by a pivot shaft 23 extending in the width direction of the motorcycle 1 in the lower middle portion of the body frame 2, that is, directly behind the engine 3, so that the swing arm 25 is pivotal up and down.

A rear-wheel suspension 26 including a cushion unit 27 is disposed at a base end of the swing arm 25 and behind the engine 3. The cushion unit 27 is connected at an upper end to the body frame 2 and at a lower end to the swing arm 25 via a link 28 and so on.

An exhaust system 30 is provided in the engine 3. As shown in FIG. 2, the exhaust system 30 includes a number of first exhaust pipes 30a corresponding to the number of cylinders in the engine 3 (four in this embodiment), a first collecting portion 30b, a second collecting portion 30c, a second exhaust pipe 30d, an expansion chamber body 30e, and a silencer 30f.

Figure 3:
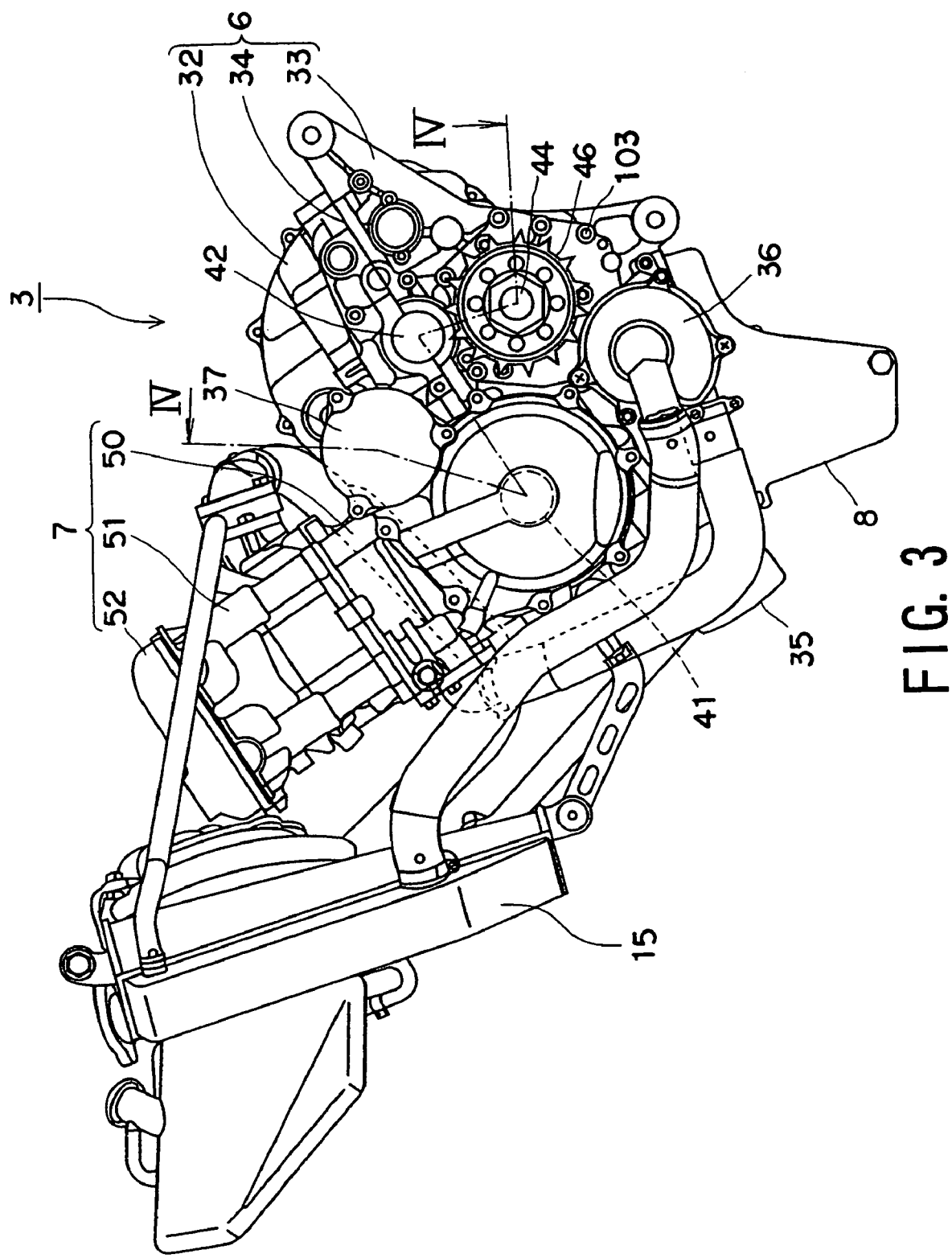
FIG. 3 is an enlarged left side view showing the engine and its surroundings.

FIG. 3 is an enlarged left side view of the engine 3 and its surroundings. As shown in FIGS. 2 and 3, the engine case 6 has a two-split (splittable or dividable) structure including an upper case section 32 and a lower case section 33. A mating surface 34 constituted by and between the upper case section 32 and the lower case section 33 extends linearly (that is, a single flat surface) and inclines forward downward in a side view of the motorcycle. An oil filter 35 is disposed on a front surface of the engine case 6, a water pump 36 is disposed on a left side surface, and a starter motor 37 and a breather case 38 are disposed on a rear surface thereof.

A crankshaft 41, a transmission input shaft 42, and a balancer shaft (i.e., secondary balancer shaft having a secondary balance weight rotated in an integrated manner with the secondary balancer shaft which eliminates the secondary vibration arising from a piston reciprocating motion in the engine) 43 extending in the width direction of the motorcycle 1 are rotatably supported at the mating surface 34 in the engine case 6, and a transmission output shaft 44 is rotatably supported in the lower case section 33. The secondary balancer shaft 43, the crankshaft 41, and the transmission input shaft 42 are arranged in the described order from the front side in the running direction of the motorcycle 1.

The transmission output shaft 44 is disposed below the transmission input shaft 42. The transmission output shaft 44 is provided with a driving sprocket 46 (as shown in FIGS. 1, 4, and 5), and a drive chain 48 is stretched between the driving sprocket 46 and a driven sprocket 47 mounted to the rear wheel 24.

The cylinder assembly 7 is mounted on the upper front side of the upper case section 32 in a manner so as to provide an angle of 90° with respect to the mating surface 34 declining forward and to tilt forward as viewed in the side view. The cylinder assembly 7 includes a cylinder block 50 provided integrally with the upper case section 32, a cylinder head 51, and a head cover 52. The fuel injector 9 is connected to an intake port 53 formed in a rear surface of the cylinder head 51, and the exhaust system 30 is connected to an exhaust port 54 formed in a front surface of the cylinder head 51, as shown in FIG. 2.

Figure 4:
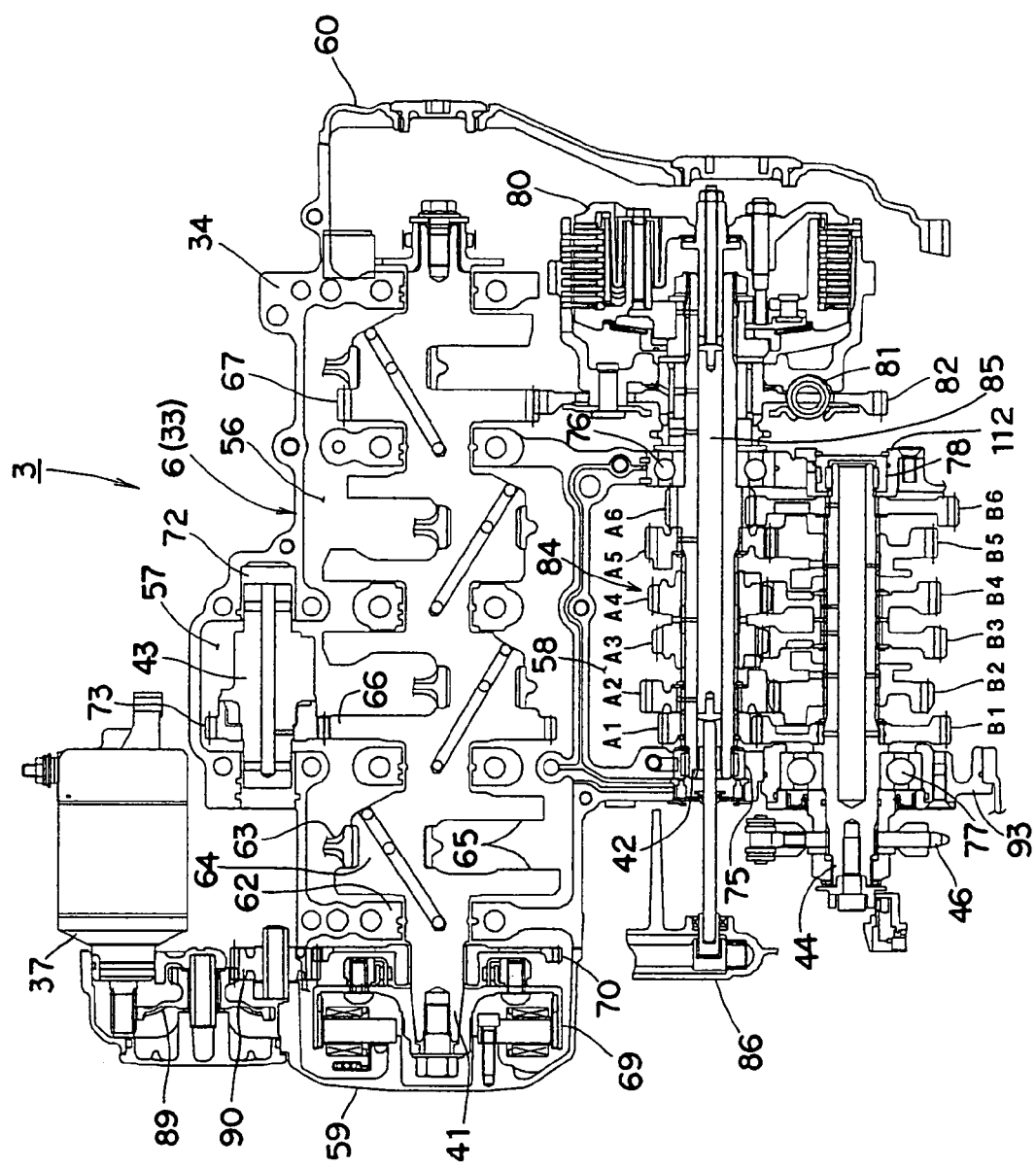
FIG. 4 is a developed view of an engine case, taken along the line IV-IV in FIG. 3.
Figure 5:
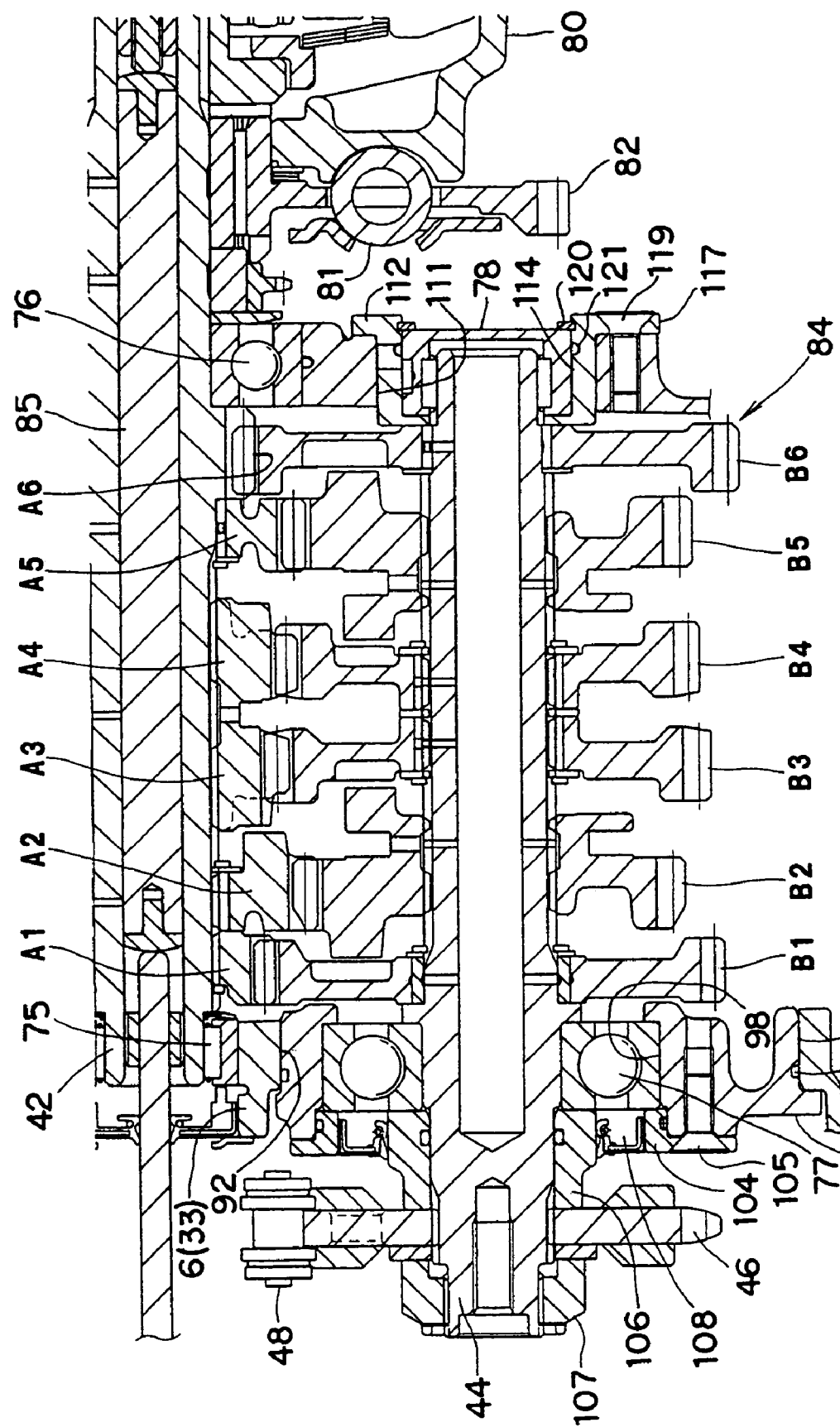
FIG. 5 is an enlarged cross-sectional view showing a transmission output shaft and its surroundings.

With reference to FIG. 4, which is a developed view of the engine case 6, a crank chamber 56 is defined in the front half portion of the engine case 6. On the front and rear sides of the crank chamber 56, a balancer shaft chamber 57 and a mission (transmission) chamber 58 are defined, respectively. A left side surface of the crank chamber 56 is covered with a magneto cover 59, and a right side surface of the engine case 6 is entirely covered with a clutch cover 60.

The crankshaft 41 is rotatably supported by five metal bearings 62 disposed in the crank chamber 56. Crank pins 64 and crank webs 65 to which four connecting rods 63 are connected are disposed integrally. A balancer driving gear 66 and a primary driving gear 67 are respectively cut on the outer peripheries of the third crank web 65 from the left side and the second crank web 65 from the right. A flywheel magneto 69 and a starter driven gear 70 are disposed at the left end of the crankshaft 41.

The secondary balancer shaft 43 is rotatably supported by a metal bearing 72 in the balancer shaft chamber 57. A balancer driven gear 73 corotatably attached to the secondary balancer shaft 43 is meshed with the balancer driving gear 66 of the crankshaft 41. The gear ratio of the balancer driving gear 66 and the balancer driven gear 73 is set at 2:1. Thus, the secondary balancer shaft 43 is rotated at double the rotating speed of the crankshaft 41, and serves to cancel secondary vibration of the engine 3.

The transmission input shaft 42 and the transmission output shaft 44 are rotatably supported, respectively, by roller bearings 75 and 78 and ball bearings 76 and 77 in the mission chamber 58. A clutch unit 80 is mounted on the right end of the transmission input shaft 42. A large-diameter primary driven gear 82 having a buffer damper 81 is corotatably disposed inside the clutch unit 80. The primary driven gear 82 is meshed with the primary driving gear 67 of the crankshaft 41. Since the number of teeth of the primary driven gear 82 is larger than that of the primary driving gear 67, the clutch unit 80 is rotated by the crankshaft 41 at a reduced speed.

Six transmission driving gears A1 to A6 are mounted on the transmission input shaft 42, and six transmission driven gears B1 to B6 are mounted on the transmission output shaft 44. The transmission driving gears A1 to A6 and the transmission driven gears B1 to B6 are always meshed with each other, thereby constituting a transmission 84. By selecting an arbitrary gear ratio of the transmission driving gears A1 to A6 and the transmission driven gears B1 to B6, the transmission output shaft 44 is rotated by the transmission input shaft 42 at a speed corresponding to the gear ratio.

The transmission input shaft 42 has a hollow structure, and a clutch release rod 85 is inserted into the hollow center of the transmission input shaft 42 from the left side. A clutch release mechanism 86 for pushing the clutch release rod 85 is disposed on the left side of the engine case 6. The clutch unit 80 and the primary driven gear 82 are normally rotated integrally with the transmission input shaft 42 so as to transmit the rotation of the crankshaft 41 to the transmission input shaft 42. When a clutch lever 87 mounted to the steering lever 21 of the motorcycle 1 is gripped, the clutch release mechanism 86 pushes the clutch release rod 85 to the right side in the axial direction, and clutch connection of the clutch unit 80 is then released. Consequently, the clutch unit 80 and the primary driven gear 82 can rotate independently of the transmission input shaft 42.

The rotation of the crankshaft 41 is sequentially transmitted to the rear wheel 24 via the primary driving gear 67, the primary driven gear 82, the clutch unit 80, the transmission input shaft 42, the transmission driving gears A1 to A6, the transmission driven gears. B1 to B6, the transmission output shaft 44, the driving sprocket 46, the drive chain 48, and the driven sprocket 47 in the described order.

During a speed-changing operation of the transmission 84, the clutch connection of the clutch unit 80 is released to make the speed-changing operation smooth. The driving force of the starter motor 37 is transmitted to the starter driven gear 79 after being reduced via a starter reduction gear 89 and a starter idle gear 90.

As shown in FIG. 5, a transmission-output-shaft insertion opening 92 having a perfectly circular shape is formed, for example, in a left side wall of the lower case section 33 of the engine case 6. The inner diameter of the transmission-output-shaft insertion opening 92 is set to be larger than the outer diameter of the transmission driven gear B6 that is the largest one of the transmission driven gears B1 to B6 fitted onto the transmission output shaft 44. An eccentric bearing holder 93 also shown in FIGS. 6 and 7 is fitted in the transmission-output-shaft insertion opening 92 from the outside of the engine case 6 in a fluid-tight and detachable manner to thereby close the transmission-output-shaft insertion opening 92.

The eccentric bearing holder 93 includes an outer fitting portion 94 shaped like a short cylinder, and the outer fitting portion 94 is cylindrically fitted in the transmission-output-shaft insertion opening 92. The outer fitting portion 94 has an outer diameter to be smoothly and tightly fitted in the transmission-output-shaft insertion opening 92. An O-ring 96 is fitted in a groove 95 formed in an outer peripheral surface of the outer fitting portion 94 to thereby provide a fluid-tight sealing between the outer fitting portion 94 and the transmission-output-shaft insertion opening 92. The interior of the eccentric bearing holder 93 is shaped like a stepped hole including a bearing fitting portion 98, a retainer fitting portion 99, and a bearing fixing flange 100. A fastening flange 101 having six bolt insertion holes 102 is disposed on the outer periphery of the eccentric bearing holder 93. The eccentric bearing holder 93 is fastened to the lower case section 33 by means of six bolts 103, as shown in FIG. 3.

As shown in FIG. 5, the ball bearing 77 for rotatably supporting the left end of the transmission output shaft 44 is inserted and tightly held in the bearing fitting portion 98 of the eccentric bearing holder 93. The ball bearing 77 is prevented from falling off by an annular bearing retainer 104 fastened to the eccentric bearing holder 93 by three screws 105. The driving sprocket 46 is attached, to be integrally rotatable through a spacer 106, to the left end of the transmission output shaft 44 which protrudes leftward from the ball bearing 77, and is fixed by a lock nut 107. An oil seal 108 is interposed between the spacer 106 and the bearing retainer 104.

Figure 6:
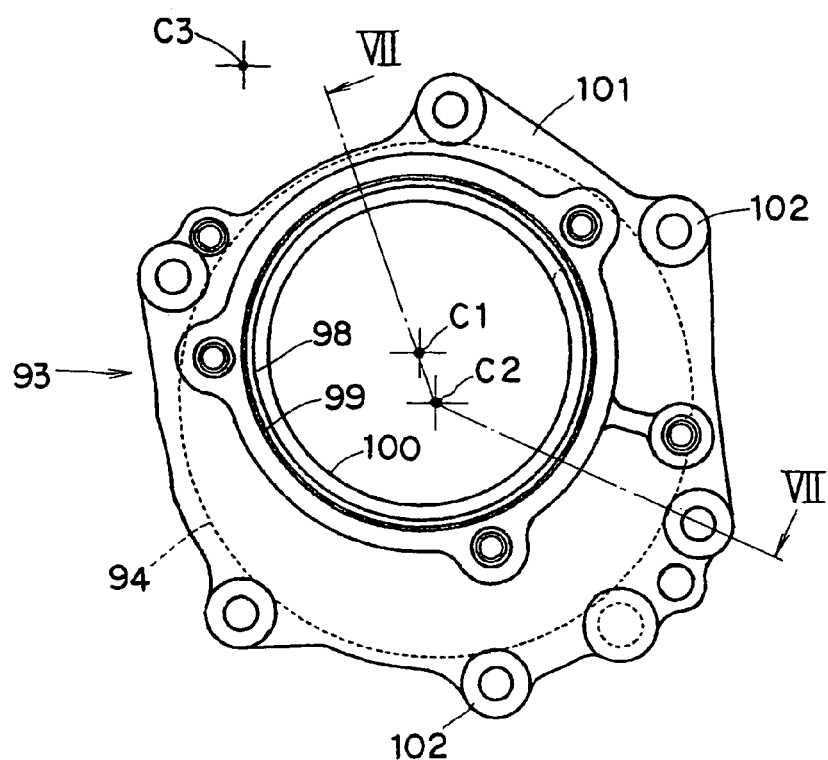
FIG. 6 is a left side view of an eccentric bearing holder.
Figure 7:
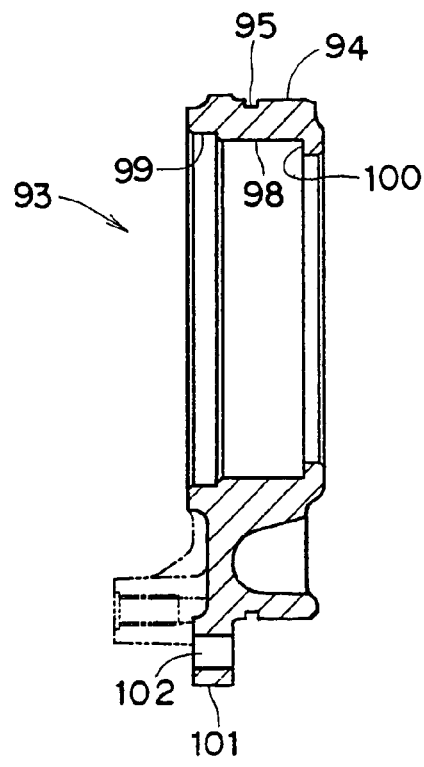
FIG. 7 is a longitudinal sectional view of the eccentric bearing holder, taken along the line VII-VII in FIG. 6.

As shown in FIG. 6, the axis of the transmission output shaft 44 in the eccentric bearing holder 93, that is, the center C1 of the bearing fitting portion 98, deviates from the center of the eccentric bearing holder 93 itself, that is, the center C2 of the outer fitting portion 94, toward the axis C3 of the transmission input shaft 42 by approximately several millimeters to several tens of millimeters.

A bearing opening 111 shaped like a perfect circle is formed in a right side wall of the lower case section 33. The inner diameter of the bearing opening 111 is markedly smaller than the inner diameter of the transmission-output-shaft insertion opening 92.

Figure 8:
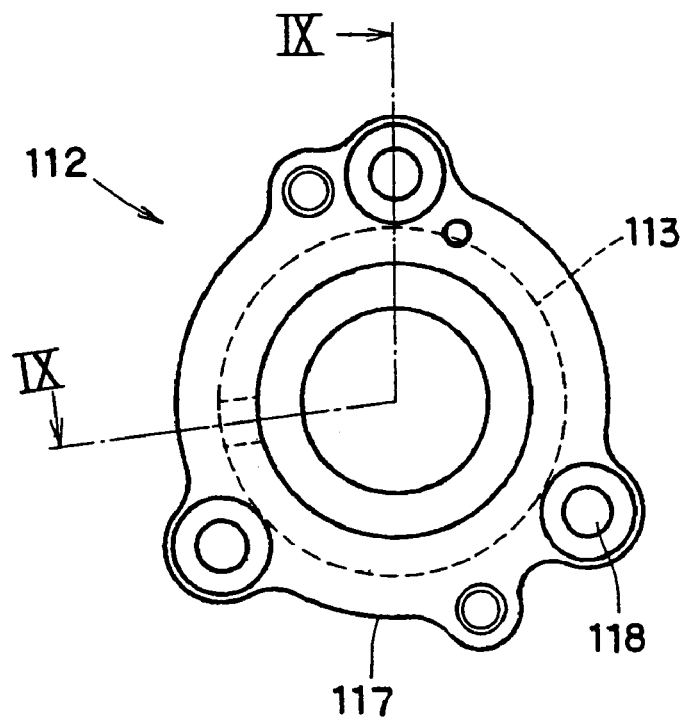
FIG. 8 is a right side view of a bearing holder.
Figure 9:
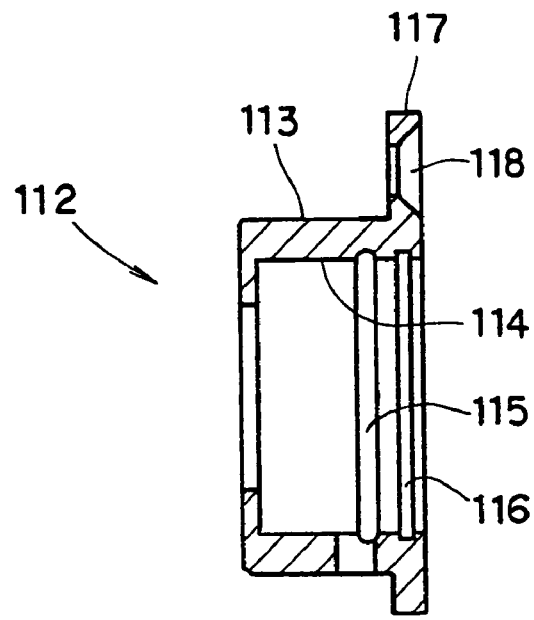
FIG. 9 is a longitudinal sectional view of the bearing holder, taken along the line IX-IX in FIG. 8.

A bearing holder 112, which is also shown in FIGS. 8 and 9, is detachably fitted in the bearing opening 111 from the outside of the engine case 6 in a fluid-tight manner. The bearing holder 112 has an outer fitting portion 113 shaped like a short cylinder, and the outer fitting portion 113 is cylindrically fitted in the bearing opening 111. The outer fitting portion 113 has an outer diameter to be smoothly and tightly fitted in the bearing opening 111.

The interior of the bearing holder 112 serves as a bearing fitting portion 114, and grooves 115 and 116 are cut on an inner peripheral surface of the bearing fitting portion 114. The outer fitting portion 113 and the bearing fitting portion 114 are worked so as to be concentric with each other. A fastening flange 117 is provided on the outer periphery of the bearing holder 112 and is formed with three screw holes 118. The bearing holder 112 is fastened to the lower case section 33 by means of three screws 119, as shown in FIG. 5.

The roller bearing 78 for rotatably supporting the right end of the transmission output shaft 44 is fitted and tightly held in the bearing fitting portion 114 of the bearing holder 112, and a circlip 120 is fitted in the groove 116 from the outer side, thereby preventing the roller bearing 78 from falling off.

Since the outer fitting portion 113 and the bearing fitting portion 114 are concentric with each other, the center of the bearing fitting portion 114, that is, the axes of the roller bearing 78 and the transmission output shaft 44, coincide with the center of the bearing holder 112. An O-ring 121 fitted in the groove 115 provides a fluid tight sealing between the bearing fitting portion 114 and the roller bearing 78.

Figure 10:
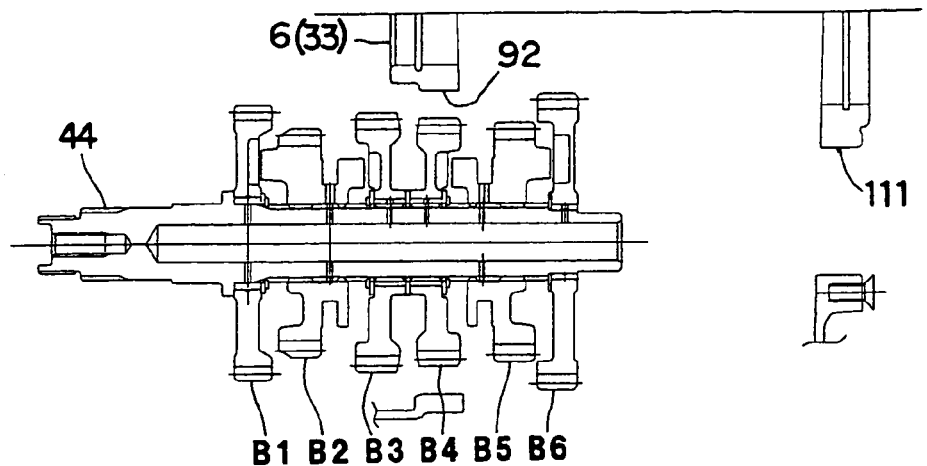
FIG. 10 is an explanatory view showing a procedure of mounting the transmission output shaft in the engine case.

FIGS. 10 to 14 show a procedure of mounting the transmission output shaft 44 in the engine case 6 (lower case section 33). First, the transmission output shaft 44 having the transmission driven gears B1 to B6 is inserted into the engine case 6 through the transmission-output-shaft insertion opening 92 (FIG. 10). Since the inner diameter of the transmission-output-shaft insertion opening 92 is larger than the outer diameter of the largest transmission driven gear B6, the transmission output shaft 44 and the transmission driven gears B1 to B6 can be easily inserted in the engine case 6.

Figure 11:
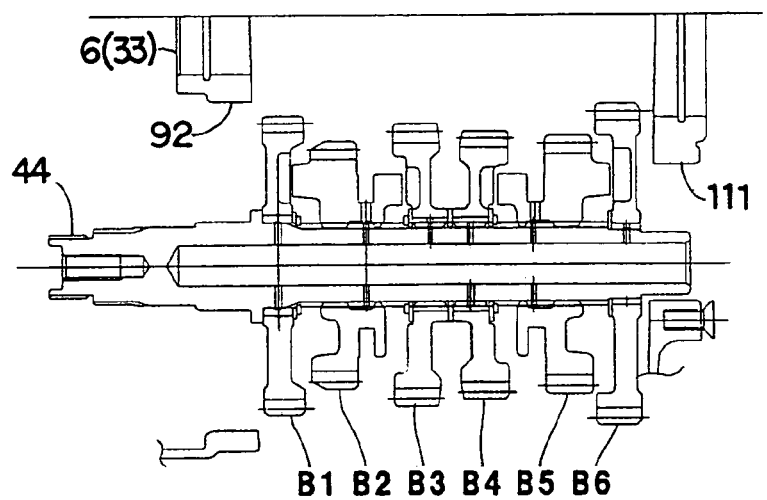
FIG. 11 is an explanatory view showing the procedure of mounting the transmission output shaft in the engine case.

During this insertion, the transmission output shaft 44 is held in a position so that the transmission driven gears B1 to B6 do not interfere with the transmission driving gears A1 to A6 of the transmission input shaft 42. The transmission output shaft 44 may be inserted in the axial direction in a state that the axis of the transmission output shaft 44 coincides with the center of the transmission-output-shaft insertion opening 92. Then, the leading end (right end) of the transmission output shaft 44 is eccentrically exposed from the bearing opening 111 (FIG. 11).

Figure 12:
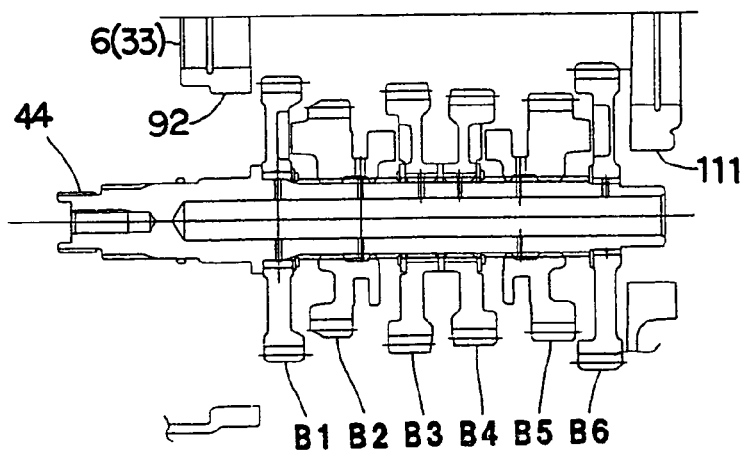
FIG. 12 is an explanatory view showing the procedure of mounting the transmission output shaft in the engine case.

Subsequently, the transmission output shaft 44 is shifted in the radial direction (in a direction orthogonal to the axial direction) until the transmission driven gears B1 to B6 is meshed with the transmission driving gears A1 to A6, as shown in FIG. 5 (FIG. 12).

Figure 13:
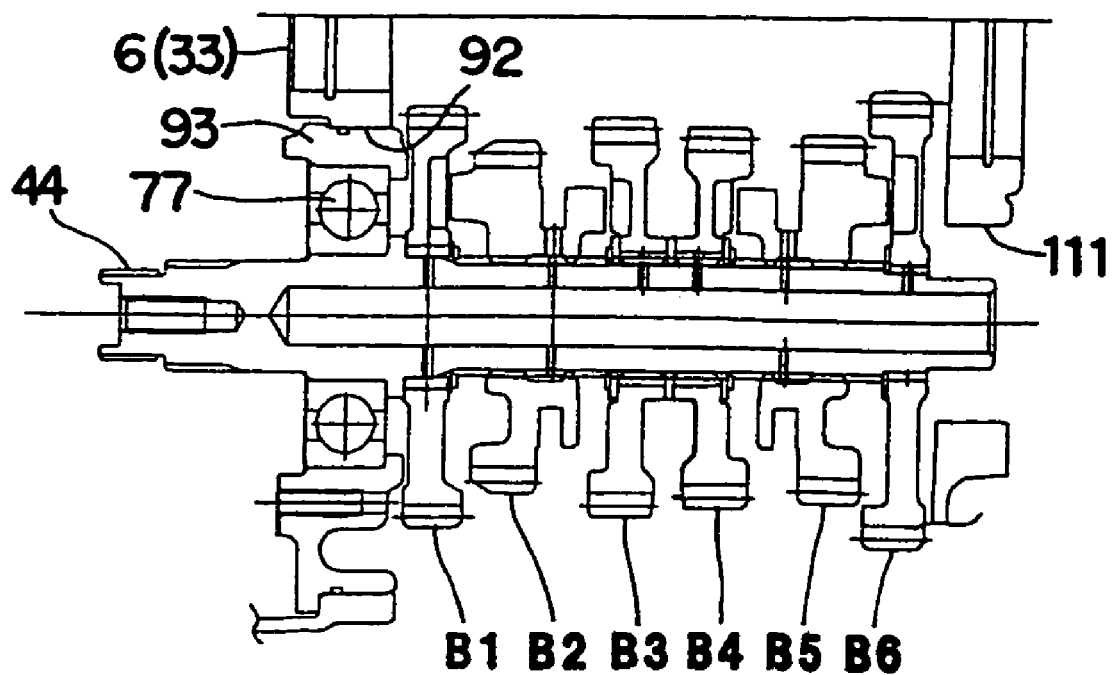
FIG. 13 is an explanatory view showing the procedure of mounting the transmission output shaft in the engine case.
Figure 14:
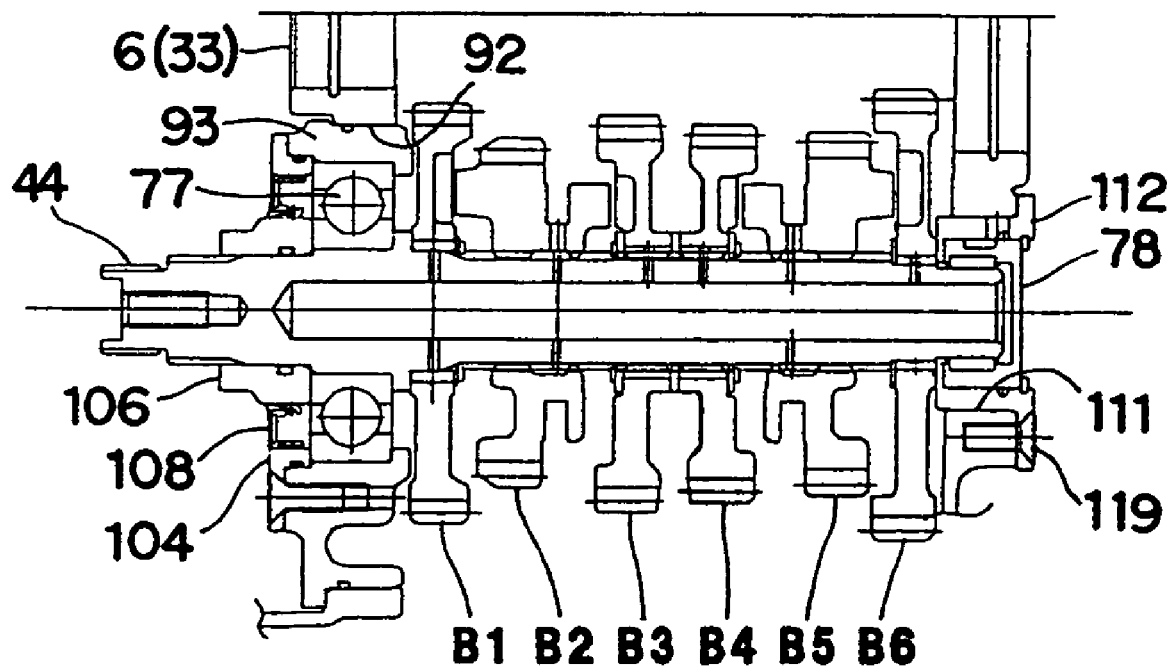
FIG. 14 is an explanatory view showing the procedure of mounting the transmission output shaft in the engine case.

Then, the eccentric bearing holder 93 having the ball bearing 77 is fitted in the transmission-output-shaft insertion opening 92, and is fastened by the bolts 103 shown in FIG. 3 (FIG. 13). The bearing holder 112 having the roller bearing 78 is fitted in the bearing opening 111 and is fastened by the screws 119 (FIG. 14). Finally, the bearing retainer 104, the spacer 106, the oil seal 108, the driving sprocket 46, the lock nut 107 and the like are mounted.

In the above procedure, by thus mounting the transmission output shaft 44, the bearing holder 93, and the bearing opening 111 in the engine case 6, the transmission output shaft 44 having the transmission driven gears B1 to B6 can be mounted in the engine case 6 through the transmission-output-shaft insertion opening 92 while preventing the transmission driven gears B1 to B6 from interfering with the transmission driving gears A1 to A6 of the transmission input shaft 42. This can enhance the assembling efficiency of the engine 3.

The step of fitting the eccentric bearing holder 93 in the transmission-output-shaft insertion opening 92 and the step of fitting the bearing holder 112 in the bearing opening 111 may be reversed in order. In this case, since the bearing holder 112 having the non-eccentric roller bearing 78 is earlier mounted in the engine case 6, the transmission output shaft 44 can be easily positioned when mounting the bearing holder 93 having the ball bearing 77 eccentrically mounted thereon. This can further enhance the assembling efficiency of the engine 3.

In the engine 3, the crankshaft 41, the transmission input shaft 42, and the secondary balancer shaft 43 are rotatably supported at the mating surface 34 between the upper case section 32 and the lower case section 33 that constitute the engine case 6, and the transmission output shaft 44 is rotatably supported in the lower case section 33. Therefore, the transmission output shaft 44 can be disposed below the other rotation shafts 41, 42, and 43. This can reduce the front-rear length of the engine case 6 and the total size of the engine 3.

Since only one mating surface 34 of the engine case sections is provided, the workability of the engine case 6 and the mountability of the rotation shafts can be highly improved.

Further, the mating surface 34 declines forward in the side view of the motorcycle, and the secondary balancer shaft 43, the crankshaft 41, and the transmission input shaft 42 are arranged in the described order from the front side in the motorcycle running direction. Accordingly, it is possible to reduce the space occupied by the rotation shafts 41, 42, and 43 in the front-rear direction (longitudinal direction) to thereby effectively utilize the front and rear spaces of the crankshaft 41 and to mainly reduce the front-rear size of the engine case 6.

Since the transmission output shaft 44 is disposed below the transmission input shaft 42, it can be arranged near the crankshaft 41. This can increase the space occupation efficiency in the engine case 6. In this respect, the front-rear size of the engine case 6 can also be reduced.

The axis C1 of the transmission output shaft 44 in the eccentric bearing holder 93 (the center of the bearing fitting portion 98) deviates from the center C2 of the eccentric bearing holder 93 itself (the center of the outer fitting portion 94) toward the axis C3 of the transmission input shaft 42. Therefore, the ball bearing 77 supporting the left end of the transmission output shaft 44 can be attached to and detached from the engine case 6 (lower case section 33) along with the eccentric bearing holder 93 and can be placed extremely close to the roller bearing 75 supporting the left end of the transmission input shaft 42. This makes it possible to reduce the center distance between the transmission input shaft 42 and the transmission output shaft 44, thereby making the engine case 6 more compact.

In addition, the transmission output shaft 44 can be smoothly inserted in the engine case 6 through the transmission-output-shaft insertion opening 92 while preventing the transmission driven gears B1 to B6 mounted on the transmission output shaft 44 from interfering with the transmission driving gears A1 to A6 mounted on the transmission input shaft 42. This can enhance the mountability of the transmission output shaft 44 and the transmission driven gears B1 to B6.

Since the center of the bearing holder 112, which holds the roller bearing 78 at the right end of the transmission output shaft 44, coincides with the axis of the transmission output shaft 44, the bearing holder 112 can be more efficiently mounted in the engine case 6, the transmission output shaft 44 can be reliably positioned by the bearing holder 112, and the eccentric bearing holder 93 can be easily mounted in the engine case 6.

The outer fitting portion 94 of the eccentric bearing holder 93 and the outer fitting portion 113 of the bearing holder 112 are tightly and cylindrically fitted in the transmission-output-shaft insertion opening 92 and the bearing opening 111, respectively, and accordingly, the surfaces of the fitting portions can be cut simply in the cylindrical form. This can increase the working accuracy of the portions, and dramatically increase the positioning accuracy of the ball bearing 77 and the roller bearing 78.

Moreover, since the load applied to the ball bearing 77 and the roller bearing 78 can be received by the cylindrical fitting surfaces in the radial direction of the transmission output shaft 44, the support rigidity of the bearings 77 and 78 can be increased markedly.

While the engine 3 of this embodiment is of a parallel four-cylinder type, the present invention can be widely applied to any engine without being limited by the number or arrangement of the cylinders as long as the engine has an engine case splittable into an upper case section and a lower case section, and shafts rotatably supported in the engine case extend in the motorcycle width direction.

It is to be noted that the present invention is not limited to the described embodiment and many other changes and modifications may be made without departing from the scopes of the appended claims.

What is claimed is:

1. An engine for a motorcycle, comprising:
an engine case splittable into an upper case section and a lower case section;
a crankshaft and a transmission input shaft extending in a width direction of the motorcycle and rotatably supported at a mating surface constituted by and between the upper case section and the lower case section; and
a transmission output shaft rotatably supported in the lower case section to be rotatable by the transmission input shaft, wherein one side surface of the lower case section has a circular transmission-output-shaft insertion opening through which the transmission output shaft is inserted in the lower case section of the engine case from an outside thereof, wherein said circular transmission-output-shaft insertion opening is provided entirely in said lower case section, an eccentric bearing holder for holding a bearing that rotatably supports one end of the transmission output shaft is mounted in the transmission-output-shaft insertion opening in a detachable manner from the outside of the engine case, and an axis of the transmission output shaft deviates from the center of the eccentric bearing holder toward the transmission input shaft.

2. The motorcycle engine according to claim 1, wherein the transmission-output-shaft insertion opening has an inner diameter set to be larger than an outer diameter of the largest one of transmission driven gears mounted on the transmission output shaft.

3. The motorcycle engine according to claim 1, wherein the eccentric bearing holder is tightly and cylindrically fitted in the transmission-output-shaft insertion opening.

4. The motorcycle engine according to claim 1, wherein another side wall of the lower case section has a circular bearing opening, a bearing holder for holding a bearing that rotatably supports another end of the transmission output shaft is mounted in the bearing opening in a manner detachable from the outside of the engine case, and the center of the bearing holder coincides with the axis of the transmission output shaft.

5. The motorcycle engine according to claim 4, wherein the bearing holder is cylindrically and tightly fitted in the bearing opening.

6. A method of assembling a motorcycle engine, comprising the steps of:
   inserting a transmission output shaft having a plurality of transmission driven gears into an engine case in an axial direction through a circular transmission-output-shaft insertion opening provided in one side surface of the engine case while holding the transmission output shaft in a position so as not to interfere with transmission driving gears of a transmission input shaft rotatably supported in the engine case, the transmission output shaft being inserted such that a leading end thereof is eccentrically exposed from a circular bearing opening provided in another side surface of the engine case, the circular bearing opening having a diameter smaller than that of the transmission-output-shaft insertion opening;
   shifting the inserted transmission output shaft toward the transmission input shaft so as to mesh the transmission driven gears of the transmission output shaft with the transmission driving gears of the transmission input shaft;
   fitting an eccentric bearing holder in the transmission-output-shaft insertion opening, the eccentric bearing holder having a bearing that is eccentrically attached thereto so as to support the transmission output shaft; and
   fitting a bearing holder in the circular bearing opening, the bearing holder having a bearing that is concentrically attached thereto so as to support the transmission output shaft.

7. The assembling method according to claim 6, wherein the step of fitting the eccentric bearing holder in the transmission-output-shaft insertion opening and the step of fitting the bearing holder in the circular bearing opening are reversed to each other in order.

8. A method of assembling a motorcycle engine, comprising the steps of:
   inserting a transmission output shaft having a plurality of transmission driven gears into an engine case in an axial direction through a circular transmission-output-shaft insertion opening provided in one side surface of the engine case such that an axis of the transmission output shaft coincides with the center of the transmission-output-shaft insertion opening, the transmission output shaft being inserted so that a leading end thereof is eccentrically exposed from a circular bearing opening provided in another side surface of the engine case, the circular bearing opening having a diameter smaller than that of the transmission-output-shaft insertion opening;
   shifting the inserted transmission output shaft toward a transmission input shaft rotatably supported in the engine case so as to mesh the transmission driven gears of the transmission output shaft with transmission driving gears mounted on the transmission input shaft;
   fitting an eccentric bearing holder in the transmission-output-shaft insertion opening, the eccentric bearing holder having a bearing that is eccentrically attached thereto so as to support the transmission output shaft; and
   fitting a bearing holder in the circular bearing opening, the bearing holder having a bearing that is concentrically attached thereto so as to support the transmission output shaft.

9. The assembling method according to claim 8, wherein the step of fitting the eccentric bearing holder in the transmission-output-shaft insertion opening and the step of fitting the bearing holder in the circular bearing opening are reversed to each other in order.

* * * * *